US011459887B2

(12) United States Patent
Li et al.

(10) Patent No.: US 11,459,887 B2
(45) Date of Patent: Oct. 4, 2022

(54) SYSTEM FOR NAVIGATION DETECTION AND INCLINATION MEASUREMENT OF ADVANCED HYDRAULIC SUPPORTS

(71) Applicants: SHANDONG UNIVERSITY OF SCIENCE AND TECHNOLOGY, Qingdao (CN); Tiandi Science & Technology Co., Ltd., Beijing (CN)

(72) Inventors: Yuxia Li, Qingdao (CN); Kun Zhang, Qingdao (CN); Liangsong Huang, Qingdao (CN); Yajun Xu, Qingdao (CN); Ying Ma, Qingdao (CN); Desheng Zhang, Qingdao (CN); Shaoan Sun, Qingdao (CN); Jinpeng Su, Qingdao (CN); Hongyue Chen, Qingdao (CN); Si Wu, Qingdao (CN); Zengkai Liu, Qingdao (CN)

(73) Assignees: Shandong University of Science and Technology, Qingdao (CN); Tiandi Science & Technology Co., Ltd., Beijing (CN)

( * ) Notice: Subject to any disclaimer, the term of this patent is extended or adjusted under 35 U.S.C. 154(b) by 0 days.

(21) Appl. No.: 17/280,277

(22) PCT Filed: Dec. 31, 2020

(86) PCT No.: PCT/CN2020/000335
§ 371 (c)(1),
(2) Date: Mar. 26, 2021

(87) PCT Pub. No.: WO2021/134739
PCT Pub. Date: Jul. 8, 2021

(65) Prior Publication Data
US 2022/0120181 A1    Apr. 21, 2022

(30) Foreign Application Priority Data
Jan. 3, 2020    (CN) .......................... 202010006895.5

(51) Int. Cl.
*E21D 23/12*    (2006.01)
*G01C 9/02*    (2006.01)
(Continued)

(52) U.S. Cl.
CPC ............... *E21D 23/12* (2013.01); *G01C 9/02* (2013.01); *G01S 15/08* (2013.01); *E21D 15/44* (2013.01)

(58) Field of Classification Search
CPC .......... E21D 23/12; E21D 15/44; G01C 9/02; G01S 15/08
See application file for complete search history.

(56) References Cited

U.S. PATENT DOCUMENTS 10,404,948 B2 *  9/2019  Rahms ................... E21C 35/24
10,890,068 B2 *  1/2021  McKenzie .......... E21D 23/0091
(Continued)

FOREIGN PATENT DOCUMENTS

CN            105370308 A  *  3/2016  ............. E21D 23/12

*Primary Examiner* — Janine M Kreck
(74) *Attorney, Agent, or Firm* — Taft Stettinius & Hollister LLP (57) ABSTRACT

A system for navigation detection and inclination measurement of advanced hydraulic supports, including a detection device module, a signal transfer transmission module, connected to the detection device module, and used to integrate ultrasonic signals and inclination signals received from all advanced hydraulic supports and then wirelessly transmit all the signals to an analysis and processing module. The analysis and processing module, connected to the signal transfer transmission module, and used to receive the signals from the signal integration and transmission device for analysis, where if an analysis result shows an abnormal situation, an alarm will b e immediately given to a worker. If the analysis result shows a continuous abnormal situation, or a relatively large value indicating the abnormal situation is generated, a command will be immediately sent to make (Continued)

the advanced hydraulic supports stop operating in a current mode.

8 Claims, 2 Drawing Sheets

(51) Int. Cl.
*G01S 15/08* (2006.01)
*E21D 15/44* (2006.01)

(56) References Cited

U.S. PATENT DOCUMENTS

| 2006/0158017 A1* | 7/2006 | McKenzie | E21D 19/02 |
| | | | 299/1.7 |
| 2016/0061036 A1* | 3/2016 | Siegrist | E21D 23/12 |
| | | | 340/666 |

* cited by examiner

SYSTEM FOR NAVIGATION DETECTION AND INCLINATION MEASUREMENT OF ADVANCED HYDRAULIC SUPPORTS

CROSS-REFERENCE TO RELATED APPLICATIONS

The present application is a national phase entry of PCT/CN2020/000335 filed Dec. 31, 2020 which claims priority to Chinese Patent Application No. 202010006895.5, filed to the China National Intellectual Property Administration (CNIPA) on Jan. 3, 2020 and entitled "SYSTEM FOR NAVIGATION DETECTION AND INCLINATION MEASUREMENT OF ADVANCED HYDRAULIC SUPPORTS", which are incorporated herein by reference in its entirety.

TECHNICAL FIELD

The present disclosure relates to the technical field of mining in coal mine laneways, in particular to a system for navigation detection and inclination measurement of advanced hydraulic supports.

BACKGROUND

A set of advanced hydraulic supports is typically composed of a left hydraulic support, a right hydraulic support identical to the left hydraulic support, and hydraulic cylinders connected between the left and right hydraulic supports. The set of advanced hydraulic supports in a supporting state can simultaneously move forwards in their advancing direction, and can simultaneously move horizontally by means of the extension and retraction of the hydraulic cylinders connected between the two hydraulic supports. However, at present, the following three situations frequently occur during the operation of the advanced hydraulic supports: firstly, when the advanced hydraulic supports move forwards or horizontally, the lateral portions of the advanced hydraulic supports are prone to hitting two side walls of a laneway, preventing the advanced hydraulic supports against movements; secondly, when the advanced hydraulic supports move forwards, the front ends of top plates and bottom plates of the hydraulic supports will hit obstacles such as rocks existing at the bottom or top of the laneway; and thirdly, due to the unevenness of the laneway, an extremely large inclination may be formed by the front end and rear end of the plane of the top plate of the single hydraulic support, or an extremely large height difference may be generated between the planes of the top plates of the hydraulic supports, causing the hydraulic supports to fall or malfunction. Any one of the three situations above will affect the normal operation of the advanced hydraulic supports. This will cause project delays and certain economic losses, and even endanger the life safety of coal miners.

SUMMARY

To overcome the shortcomings of the prior art, the present disclosure provides a system for navigation detection and inclination measurement of advanced hydraulic supports, which can effectively improve efficiency of safe operation of advanced hydraulic supports, enhance the safety coefficient of the operation of the advanced hydraulic supports, and achieve the advanced nature of intelligent coal mining.

To solve the above technical issue, the present disclosure adopts the following technical solutions: The present disclosure provides a system for navigation detection and inclination measurement of advanced hydraulic supports, including:

a detection device module, including ultrasonic sensors and inclination measurement devices, and used to measure distances between obstacles and advanced hydraulic supports and acquire inclination signals of the advanced hydraulic supports;

a signal transfer transmission module, including a signal integration and transmission device, located in a laneway, connected to the detection device module, and used to integrate, according to a serial number of each said advanced hydraulic support, ultrasonic signals and inclination signals received from all advanced hydraulic supports and then wirelessly transmit all the signals to an analysis and processing module; and the analysis and processing module, located outside the laneway, connected to the signal transfer transmission module, and used to receive the signals from the signal integration and transmission device for analysis, where if an analysis result shows an abnormal situation, an alarm will be immediately given to a worker; and if the analysis result shows a continuous abnormal situation, or a relatively large value indicating the abnormal situation is generated, a command will be immediately sent to make the advanced hydraulic supports stop operating in a current mode.

Further, the ultrasonic sensors include:

an ultrasonic sensor at a front end of a top plate of the advanced hydraulic support and an ultrasonic sensor at a front end of a bottom plate of the advanced hydraulic support, where the ultrasonic sensor at the front end of the top plate is located on a front side of the top plate of a single advanced hydraulic support, and is used to determine whether there is an obstacle in front of the top plate by emitting an ultrasonic wave and receiving an ultrasonic wave, measure the distance between the obstacle and the ultrasonic sensor at the front end of the top plate, and wirelessly transmit an obtained signal to the signal integration and transmission device; and the ultrasonic sensor at the front end of the bottom plate is located on a front side of the bottom plate of the single advanced hydraulic support, and is used to determine whether there is an obstacle in front of the bottom plate by emitting an ultrasonic wave and receiving an ultrasonic wave, measure the distance between the obstacle and the ultrasonic sensor at the front end of the bottom plate, and wirelessly transmit an obtained signal to the signal integration and transmission device;

an ultrasonic sensor laterally on the front portion of the top plate and an ultrasonic sensor laterally on the rear portion of the top plate, where the ultrasonic sensor laterally on the front portion of the top plate is fixed to the front portion of the top plate, corresponds to a front hydraulic cylinder for horizontal movement of the top plate, and is used to determine whether there is an obstacle in a lateral direction of the front portion of the top plate by emitting an ultrasonic wave and receiving an ultrasonic wave and measure the distance between the obstacle and the ultrasonic sensor laterally on the front portion of the top plate; and the ultrasonic sensor laterally on the rear portion of the top plate is fixed to the rear portion of the top plate, corresponds to a rear hydraulic cylinder for horizontal movement of the top plate, and is used to determine whether there is an obstacle in a lateral direction of the rear portion of the top plate by emitting an ultrasonic wave and receiving an ultrasonic wave and measure the distance between the obstacle and the ultrasonic sensor laterally on the rear portion of the top plate; and an ultrasonic sensor laterally in the middle of the bottom plate, where the ultrasonic sensor laterally in the middle of the bottom plate is fixed to the middle of the bottom plate, corresponds to a hydraulic cylinder for horizontal movement of the bottom plate, and is used to determine whether there is an obstacle in a lateral direction of the middle of the bottom plate by emitting an ultrasonic wave and receiving an ultrasonic wave and measure the distance between the obstacle and the ultrasonic sensor laterally in the middle of the bottom plate.

Further, the inclination measurement devices are respectively arranged on a top plate and bottom plate of the single advanced hydraulic support; and each said inclination measurement device includes:

an middle reference displacement sensor, laterally located in the middle of the top plate or the bottom plate, and used to acquire a displacement signal in a lateral direction of the middle of the top plate or the bottom plate and transmit the displacement signal to a signal collection and transmission device;

a front displacement sensor, laterally located on a front portion of the top plate or the bottom plate, and used to acquire a displacement signal in a lateral direction of the front portion of the top plate or the bottom plate and transmit the displacement signal to the signal collection and transmission device;

a rear displacement sensor, laterally located on a rear portion of the top plate or the bottom plate, and used to acquire a displacement signal in a lateral direction of the rear portion of the top plate or the bottom plate and transmit the displacement signal to the signal collection and transmission device; and the signal collection and transmission device, located beside the middle reference displacement sensor, and used to process the displacement signals received from the middle reference displacement sensor, front displacement sensor, and rear displacement sensor into the inclination signals and wirelessly transmit these inclination signals to the signal integration and transmission device in a laneway.

Optionally, the analysis and processing module includes a signal receiving and transmission device and a computer for analysis; and the signal receiving and transmission device receives the signals from the signal integration and transmission device and then transmits these signals to the computer for analysis to obtain an analysis result.

A system for navigation detection and inclination measurement of advanced hydraulic supports is provided, including a detection device module, a signal transfer transmission module, and an analysis and processing module; where the detection device module is arranged on a single advanced hydraulic support;

the detection device module includes ultrasonic sensors and inclination measurement devices, where the ultrasonic sensors are used to emit ultrasonic waves to an outside of the single advanced hydraulic support and receive ultrasonic signals reflected from obstacles; and the inclination measurement devices are used to detect displacement signals of the single advanced hydraulic support and obtain inclination signals of the single advanced hydraulic support according to the displacement signals;

the signal transfer transmission module includes a signal integration and transmission device, and is located in a laneway, connected to the detection device module, and used to integrate, according to a serial number of each said advanced hydraulic support, ultrasonic signals and inclination signals received from all advanced hydraulic supports and then wirelessly transmit all the signals to the analysis and processing module; and the analysis and processing module is located outside the laneway, connected to the signal transfer transmission module, and used to receive the signals from the signal integration and transmission device for analysis, where if an analysis result shows an abnormal situation, an alarm will be immediately given to a worker; if the analysis result shows a continuous abnormal situation, or a relatively large value indicating the abnormal situation is generated, a command will be immediately sent to make the advanced hydraulic supports stop operating in a current mode; the abnormal situation shown in the analysis result particularly refers to that values of the distances between the obstacles and the advanced hydraulic supports are not greater than a distance threshold, or values of the inclination signals are not less than a first inclination threshold; the continuous abnormal situation shown in the analysis result particularly refers to that values of duration of the inclination signals are not less than a time threshold of the abnormal situation; and the relatively large value indicating the abnormal situation refers to that the values of the inclination signals are not less than a second inclination threshold.

Optionally, the ultrasonic sensors include an ultrasonic sensor at a front end of a top plate, an ultrasonic sensor laterally on a front portion of the top plate, an ultrasonic sensor laterally on a rear portion of the top plate, an ultrasonic sensor at a front end of a bottom plate, and an ultrasonic sensor laterally in the middle of the bottom plate; where the ultrasonic sensor at the front end of the top plate is located on a front side of the top plate of the single advanced hydraulic support, and is used to emit an ultrasonic wave to a forward direction of the top plate of the single advanced hydraulic support, receive an ultrasonic signal reflected from an obstacle, and wirelessly transmit the ultrasonic signal obtained from the forward direction of the top plate to the signal integration and transmission device; and the ultrasonic sensor at the front end of the bottom plate is located on a front side of the bottom plate of the single advanced hydraulic support, and is used to emit an ultrasonic wave to a forward direction of the bottom plate of the single advanced hydraulic support, receive an ultrasonic signal reflected from an obstacle, and wirelessly transmit the ultrasonic signal obtained from the forward direction of the bottom plate to the signal integration and transmission device;

the ultrasonic sensor laterally on the front portion of the top plate is laterally fixed to the front portion of the top plate, corresponds to a front hydraulic cylinder for horizontal movement of the top plate, and is used to emit an ultrasonic wave to a lateral direction of the front portion of the top plate of the signal advanced hydraulic support, receive an ultrasonic signal reflected from an obstacle, and wirelessly transmit the ultrasonic signal obtained from the lateral direction of the font portion of the top plate to the signal integration and transmission device; and the ultrasonic sensor laterally on the rear portion of the top plate is laterally fixed to the rear portion of the top plate, corresponds to a rear hydraulic cylinder for horizontal movement of the top plate, and is used to emit an ultrasonic wave to a lateral direction of the rear portion of the top plate of the single advanced hydraulic support, receive an ultrasonic signal reflected from an obstacle, and wirelessly transmit the ultrasonic signal obtained from the lateral direction of the rear portion of the top plate to the signal integration and transmission device; and the ultrasonic sensor laterally in the middle of the bottom plate is fixed to the middle of the bottom plate, corresponds to a hydraulic cylinder for horizontal movement of the bottom plate, and is used to emit an ultrasonic wave to a lateral direction of the middle of the bottom plate of the single advanced hydraulic support, receive an ultrasonic signal reflected from an obstacle, and wirelessly transmit the ultrasonic signal obtained from the lateral direction of the middle of the bottom plate to the signal integration and transmission device.

Optionally, the inclination measurement devices are respectively arranged on a top plate and bottom plate of the single advanced hydraulic support; and each said inclination measurement device includes a middle reference displacement sensor, a front displacement sensor, a rear displacement sensor, and a signal collection and transmission device; where the middle reference displacement sensor is laterally located in the middle of the top plate or the bottom plate, and is used to acquire a displacement signal in a lateral direction of the middle of the top plate or the bottom plate and transmit the displacement signal to the signal collection and transmission device;

the front displacement sensor is laterally located on a front portion of the top plate or the bottom plate, and is used to acquire a displacement signal in a lateral direction of the front portion of the top plate or the bottom plate and transmit the displacement signal to the signal collection and transmission device;

the rear displacement sensor is laterally located on a rear portion of the top plate or the bottom plate, and is used to acquire a displacement signal in a lateral direction of the rear portion of the top plate or the bottom plate and transmit the displacement signal to the signal collection and transmission device; and the signal collection and transmission device beside the corresponding middle reference displacement sensor is used to process the displacement signals received from the middle reference displacement sensor, front displacement sensor, and rear displacement sensor into the inclination signals and wirelessly transmit these inclination signals to the signal integration and transmission device in a laneway.

Optionally, the analysis and processing module includes a signal receiving and transmission device and a computer for analysis; where the signal receiving and transmission device receives the signals from the signal integration and transmission device and then transmits these signals to the computer for analysis to obtain an analysis result.

The present disclosure has the following beneficial effects:

1. An inclination measurement device is designed to effectively measure an inclination of front and rear ends of a top plate or bottom plate of a single advanced hydraulic support and give an early warning to avoid a relatively large inclination of the front and rear ends of the top plate or bottom plate of the advanced hydraulic support, so as to prevent the advanced hydraulic support against malfunction or damage.

2. Multiple ultrasonic sensors are properly arranged to effectively give early warnings, so as to prevent two lateral portions of top plates or bottom plates of a set of advanced hydraulic supports from hitting side walls of a laneway and prevent front ends of the top plates or bottom plates from hitting an obstacle.

3. Displacement sensors are properly arranged to effectively measure actual heights of the top plates or bottom plates of the set of advanced hydraulic supports in a vertical direction, so as to prevent an extremely large height difference between the top plates or bottom plates of the set of advanced hydraulic supports in the vertical direction from causing the malfunction of the advanced hydraulic supports.

The system for navigation detection and inclination measurement of advanced hydraulic supports of the present disclosure can effectively improve efficiency of safe operation of the advanced hydraulic supports, enhance the safety coefficient of the operation of the advanced hydraulic supports, and achieve the advanced nature of intelligent coal mining, thus providing a safe, efficient, and intelligent support technology for coal mine laneways.

BRIEF DESCRIPTION OF THE DRAWINGS

For the sake of a clearer explanation of the technical solutions of the embodiments of the present disclosure or the prior art, the accompanying drawings required by the embodiments will be described briefly below. Clearly, the accompanying drawings in the following description merely illustrate some embodiments of the present disclosure, and those ordinarily skilled in the art may also derive other accompanying drawings from these accompanying drawings without creative efforts.

In the figure, 1. ultrasonic sensor at a front end of a top plate, 2. ultrasonic sensor laterally on a front portion of the top plate, 3. front displacement sensor, 4. middle reference displacement sensor, 5. signal collection and transmission device, 6. rear displacement sensor, 7. inclination measurement device, 8. ultrasonic sensor laterally on a rear portion of the top plate, 9. ultrasonic sensor at a front end of a bottom plate, 10. ultrasonic sensor laterally in the middle of the bottom plate, 11. signal integration and transmission device, 12. signal receiving and transmission device, 13. computer for analysis.

DETAILED DESCRIPTION

The technical solutions of the embodiments of the present disclosure are clearly and completely described below with reference to the accompanying drawings. Apparently, the embodiments in the following descriptions are only illustrative ones, and are not all possible ones of the present disclosure. All other embodiments obtained by those ordinarily skilled in the art based on the embodiments of the present disclosure without creative efforts should also fall within the protection scope of the present disclosure.

Figure 1:
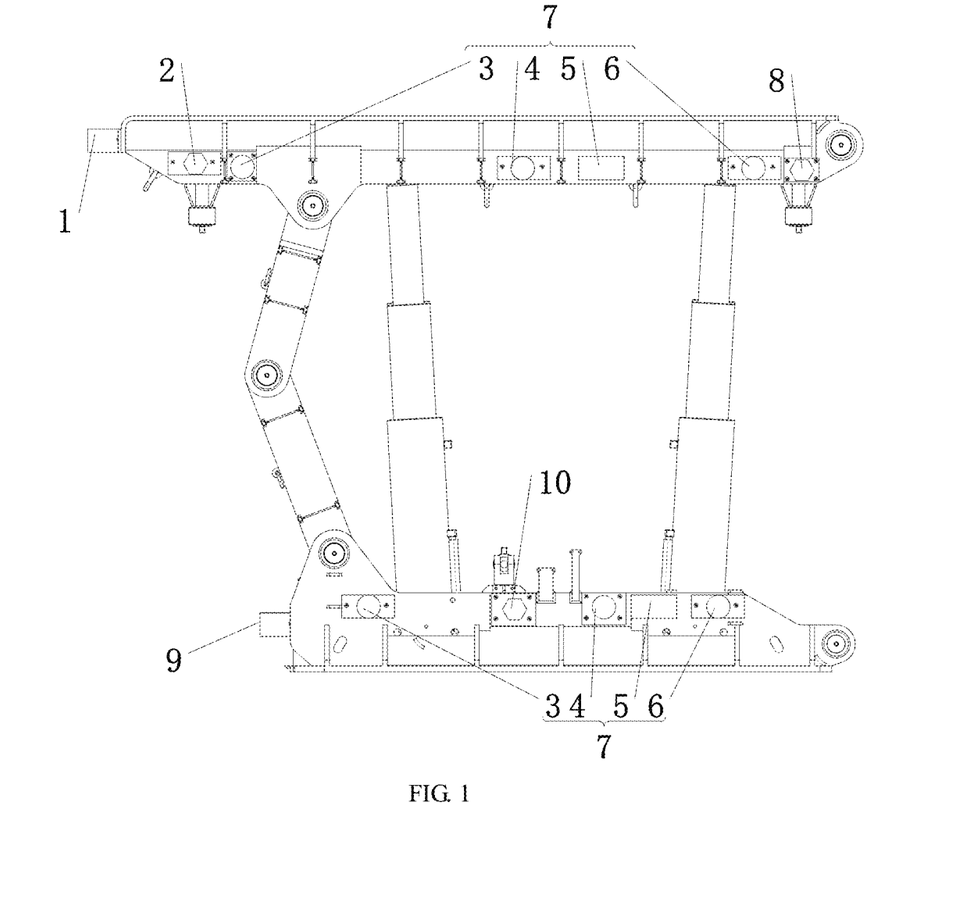
FIG. 1 is a layout drawing of sensors of a single advanced hydraulic support of the present disclosure.
Figure 2:
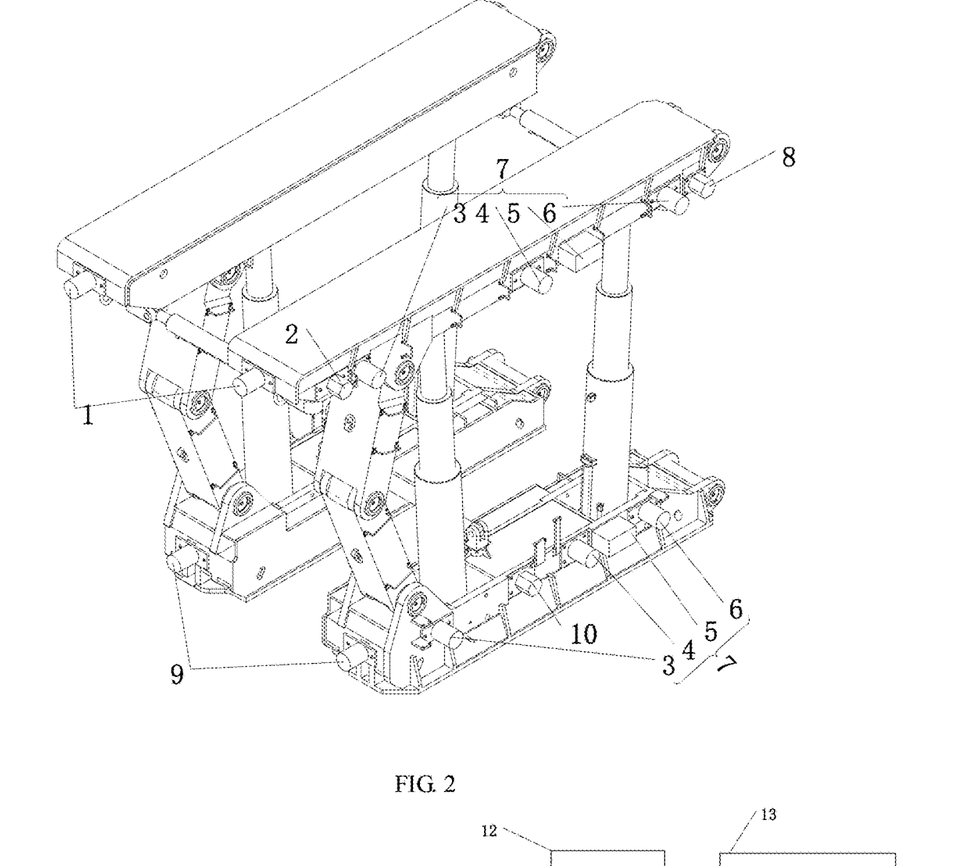
FIG. 2 is a layout drawing of sensors of a set of single advanced hydraulic supports of the present disclosure.
Figure 3:
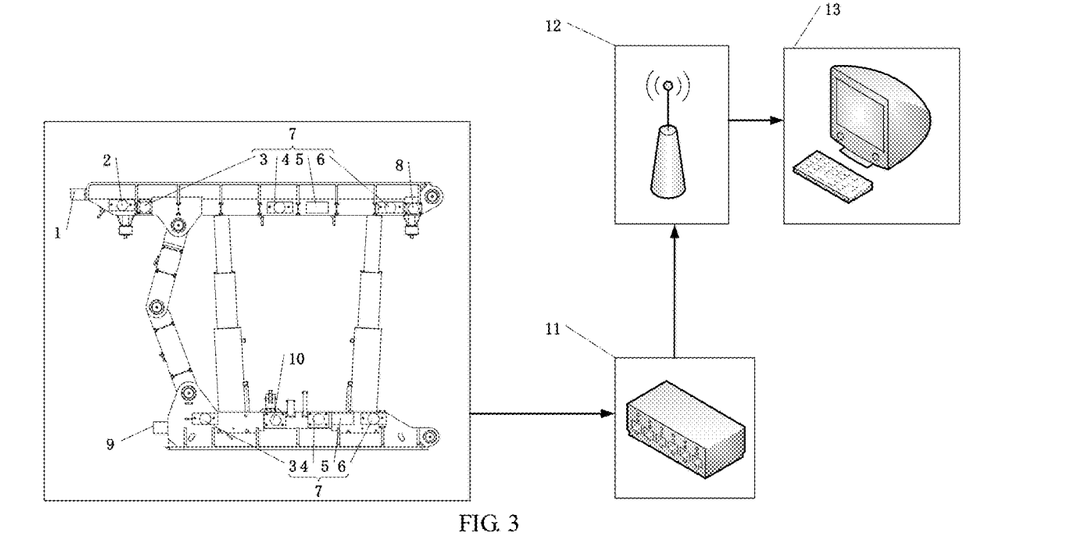
FIG. 3 is a workflow chart of a system for navigation detection and inclination measurement of advanced hydraulic supports of the present disclosure.

As shown in FIG. 1 to FIG. 3, the present disclosure is further expounded below with reference to the embodiments.

Embodiment 1

A system for navigation detection and inclination measurement of advanced hydraulic supports of the present disclosure mainly includes a detection device module, a signal transfer transmission module, and an analysis and processing module, where the detection device module includes ultrasonic sensors and inclination measurement devices 7; the signal transfer transmission module includes a signal integration and transmission device 11; and the analysis and processing module includes a signal receiving and transmission device 12 and a computer 13 for analysis. The system particularly includes an ultrasonic sensor 1 at a front end of a top plate, an ultrasonic sensor 9 at a front end of a bottom plate, an ultrasonic sensor 2 laterally on a front portion of the top plate, an ultrasonic sensor 8 laterally on a rear portion of the top plate, an ultrasonic sensor 10 laterally in the middle of the bottom plate, middle reference displacement sensors 4, front displacement sensors 3, rear displacement sensors 6, signal collection and transmission devices 5, the signal integration and transmission device 11, the signal receiving and transmission device 12, and the computer 13 for analysis.

The ultrasonic sensors in the present disclosure include the ultrasonic sensor 1 at the front end of the top plate, the ultrasonic sensor 9 at the front end of the bottom plate, the ultrasonic sensor 2 laterally on the front portion of the top plate, the ultrasonic sensor 8 laterally on the rear portion of the top plate, and the ultrasonic sensor 10 laterally in the middle of the bottom plate, where the ultrasonic sensor 1 at the front end of the top plate is located on a front side of the top plate of a single advanced hydraulic support, and is used to determine whether there is an obstacle in front of the top plate by emitting an ultrasonic wave and receiving an ultrasonic wave, measure the distance between the obstacle and the ultrasonic sensor 1, and wirelessly transmit an obtained signal to the signal integration and transmission device 11; and the ultrasonic sensor 9 at the front end of the bottom plate is located on a front side of the bottom plate of the single advanced hydraulic support, and is used to determine whether there is an obstacle in front of the bottom plate by emitting an ultrasonic wave and receiving an ultrasonic wave, measure the distance between the obstacle and the ultrasonic sensor 9, and wirelessly transmit an obtained signal to the signal integration and transmission device 11.

Similarly, the ultrasonic sensor 2 laterally on the front portion of the top plate is fixed to the front portion of the top plate, corresponds to a front hydraulic cylinder for horizontal movement of the top plate, and is used to determine whether there is an obstacle in a lateral direction of the front portion of the top plate by emitting an ultrasonic wave and receiving an ultrasonic wave and measure the distance between the obstacle (or a wall of a laneway) and the ultrasonic sensor 2; and the ultrasonic sensor 8 laterally on the rear portion of the top plate is fixed to the rear portion of the top plate, corresponds to a rear hydraulic cylinder for horizontal movement of the top plate, and is used to determine whether there is an obstacle in a lateral direction of the rear portion of the top plate by emitting an ultrasonic wave and receiving an ultrasonic wave and measure the distance between the obstacle (or the wall of the laneway) and the ultrasonic sensor 8.

The ultrasonic sensor 10 laterally in the middle of the bottom plate is fixed to the middle of the bottom plate, corresponds to a hydraulic cylinder for horizontal movement of the bottom plate, and is used to determine whether there is an obstacle in a lateral direction of the middle of the bottom plate by emitting an ultrasonic wave and receiving an ultrasonic wave and measure the distance between the obstacle (or the wall of the laneway) and the ultrasonic sensor 10.

The inclination measurement devices 7 in the present disclosure are respectively arranged on the top plate and bottom plate of the single advanced hydraulic support. Each inclination measurement device 7 includes one middle reference displacement sensor 4, one front displacement sensor 3, one rear displacement sensor 6, and one signal collection and transmission device 5, where the middle reference displacement sensor 4 is laterally located in the middle of the top plate or the bottom plate, and is used to acquire a displacement signal (namely a signal of forward movement, backward movement, or horizontal movement) in a lateral direction of the middle of the top plate or the bottom plate and transmit the displacement signal to the signal collection and transmission device 5.

The front displacement sensor 3 is laterally located on the front portion of the top plate or the bottom plate, and is used to acquire a displacement signal (namely a signal of forward movement, backward movement, or horizontal movement) in a lateral direction of the front portion of the top plate or the bottom plate and transmit the displacement signal to the signal collection and transmission device 5.

The rear displacement sensor 6 is laterally located on the rear portion of the top plate or the bottom plate, and is used to acquire a displacement signal (namely a signal of forward movement, backward movement, or horizontal movement) in a lateral direction of the rear portion of the top plate or the bottom plate and transmit the displacement signal to the signal collection and transmission device 5.

The signal collection and transmission device 5 beside the corresponding middle reference displacement sensor 4 is laterally located on the top plate or the bottom plate, and is used to process the displacement signals received from the corresponding middle reference displacement sensor 4, front displacement sensor 3, and rear displacement sensor 6 into inclination signals (in a horizontal or vertical direction) and wirelessly transmit these inclination signals to the signal integration and transmission device 11 in a laneway.

The signal integration and transmission device 11 in the present disclosure is located in the laneway, and is used to integrate, according to a serial number of each hydraulic support (advanced hydraulic support), ultrasonic signals and inclination signals received from all advanced hydraulic supports and then wirelessly transmit all the signals to the signal receiving and transmission device 12 outside the laneway.

The signal receiving and transmission device 12 in the present disclosure receives the signals from the signal integration and transmission device 11 and then transmits these signals to the computer 13 for analysis to obtain an analysis result; if an analysis result shows an abnormal situation (for example, there is a large obstacle in front of or in a lateral direction of the top plate or bottom plate of each advanced hydraulic support, the top plate or the bottom plate is extremely close to a side wall of the laneway, or a relatively large inclination of the top plate or the bottom plate is formed), the computer 13 for analysis will immediately give an alarm to a worker, so that the obstacle can be removed in time by the worker; and if the analysis result shows a continuous abnormal situation, or a relatively large value indicating the abnormal situation is generated, the computer 13 for analysis will immediately send a command to make the advanced hydraulic supports stop operating in a current mode.

Embodiment 2

A system for navigation detection and inclination measurement of advanced hydraulic supports includes a detection device module, a signal transfer transmission module, and an analysis and processing module.

The detection device module is arranged on a single advanced hydraulic support.

The detection device module includes ultrasonic sensors and inclination measurement devices 7, where the ultrasonic sensors are used to emit ultrasonic waves to an outside of the single advanced hydraulic support and receive ultrasonic signals reflected from obstacles; and the inclination measurement devices 7 are used to detect displacement signals of the single advanced hydraulic support and obtain inclination signals of the single advanced hydraulic support according to the displacement signals.

The signal transfer transmission module includes a signal integration and transmission device 11, and is located in a laneway, connected to the detection device module, and used to integrate, according to a serial number of each advanced hydraulic support, ultrasonic signals and inclination signals received from all advanced hydraulic supports and then wirelessly transmit all the signals to the analysis and processing module.

The analysis and processing module is located outside the laneway, connected to the signal transfer transmission module, and used to receive the signals from the signal integration and transmission device 11 for analysis; if an analysis result shows an abnormal situation, an alarm will be immediately given to a worker; and if the analysis result shows a continuous abnormal situation, or a relatively large value indicating the abnormal situation is generated, a command will be immediately sent to make the advanced hydraulic supports stop operating in a current mode.

The abnormal situation shown in the analysis result particularly refers to that values of the distances between the obstacles and the advanced hydraulic supports are not greater than a distance threshold, or values of the inclination signals are not less than a first inclination threshold; the continuous abnormal situation shown in the analysis result particularly refers to that values of duration of the inclination signals are not less than a time threshold of the abnormal situation; and the relatively large value indicating the abnormal situation refers to that the values of the inclination signals are not less than a second inclination threshold.

The ultrasonic sensors include an ultrasonic sensor 1 at a front end of a top plate, an ultrasonic sensor 2 laterally on a front portion of the top plate, an ultrasonic sensor 8 laterally on a rear portion of the top plate, an ultrasonic sensor 9 at a front end of a bottom plate, and an ultrasonic sensor 10 laterally in the middle of the bottom plate.

The ultrasonic sensor 1 at the front end of the top plate is located on a front side of the top plate of the single advanced hydraulic support, and is used to emit an ultrasonic wave to a forward direction of the top plate of the single advanced hydraulic support, receive an ultrasonic signal reflected from an obstacle, and wirelessly transmit the ultrasonic signal obtained from the forward direction of the top plate to the signal integration and transmission device 11.

The ultrasonic sensor 9 at the front end of the bottom plate is located on a front side of the bottom plate of the single advanced hydraulic support, and is used to emit an ultrasonic wave to a forward direction of the bottom plate of the single advanced hydraulic support, receive an ultrasonic signal reflected from an obstacle, and wirelessly transmit the ultrasonic signal obtained from the forward direction of the bottom plate to the signal integration and transmission device 11.

The ultrasonic sensor 2 laterally on the front portion of the top plate is laterally fixed to the front portion of the top plate, corresponds to a front hydraulic cylinder for horizontal movement of the top plate, and is used to emit an ultrasonic wave to a lateral direction of the front portion of the top plate of the signal advanced hydraulic support, receive an ultrasonic signal reflected from an obstacle, and wirelessly transmit the ultrasonic signal obtained from the lateral direction of the font portion of the top plate to the signal integration and transmission device 11.

The ultrasonic sensor 8 laterally on the rear portion of the top plate is laterally fixed to the rear portion of the top plate, corresponds to a rear hydraulic cylinder for horizontal movement of the top plate, and is used to emit an ultrasonic wave to a lateral direction of the rear portion of the top plate of the single advanced hydraulic support, receive an ultrasonic signal reflected from an obstacle, and wirelessly transmit the ultrasonic signal obtained from the lateral direction of the rear portion of the top plate to the signal integration and transmission device 11.

The ultrasonic sensor 10 laterally in the middle of the bottom plate is fixed to the middle of the bottom plate, corresponds to a hydraulic cylinder for horizontal movement of the bottom plate, and is used to emit an ultrasonic wave to a lateral direction of the middle of the bottom plate of the single advanced hydraulic support, receive an ultrasonic signal reflected from an obstacle, and wirelessly transmit the ultrasonic signal obtained from the lateral direction of the middle of the bottom plate to the signal integration and transmission device 11.

The inclination measurement devices 7 are respectively arranged on the top plate and bottom plate of the single advanced hydraulic support. Each inclination measurement device 7 includes a front displacement sensor 3, a rear displacement sensor 6, a middle reference displacement sensor 4, and a signal collection and transmission device 5.

The middle reference displacement sensor 4 is laterally located in the middle of the top plate or the bottom plate, and is used to acquire a displacement signal in a lateral direction of the middle of the top plate or the bottom plate and transmit the displacement signal to the signal collection and transmission device 5.

The front displacement sensor 3 is laterally located on the front portion of the top plate or the bottom plate, and is used to acquire a displacement signal in the lateral direction of the front portion of the top plate or the bottom plate and transmit the displacement signal to the signal collection and transmission device 5.

The rear displacement sensor 6 is laterally located on the rear portion of the top plate or the bottom plate, and is used to acquire a displacement signal in the lateral direction of the rear portion of the top plate or the bottom plate and transmit the displacement signal to the signal collection and transmission device 5.

The signal collection and transmission device 5 beside the corresponding middle reference displacement sensor 4 is used to process the displacement signals received from the corresponding middle reference displacement sensor 4, front displacement sensor 3, and rear displacement sensor 6 into the inclination signals and wirelessly transmit these inclination signals to the signal integration and transmission device 11 in a laneway.

The analysis and processing module includes a signal receiving and transmission device 12 and a computer 13 for analysis, where the signal receiving and transmission device 12 receives the signals from the signal integration and transmission device 11 and then transmits these signals to the computer 13 for analysis to obtain an analysis result.

The embodiments of the present disclosure are described above with reference to the accompanying drawings, but the present disclosure is not limited to the above specific embodiments. The above specific embodiments are merely illustrative and not restrictive. Those ordinarily skilled in the art may make several modifications to the present disclosure without departing from the purpose of the present disclosure and the scope of protection of the claims, and these modifications should all fall within the protection of the present disclosure.

What is claimed is:

1. A system for navigation detection and inclination measurement of advanced hydraulic supports, comprising:
    a detection device module, comprising ultrasonic sensors and inclination measurement devices, and used to measure distances between obstacles and advanced hydraulic supports and acquire inclination signals of the advanced hydraulic supports;
    a signal transfer transmission module, comprising a signal integration and transmission device, located in a laneway, connected to the detection device module, and used to integrate, according to a serial number of each said advanced hydraulic support, ultrasonic signals and inclination signals received from all advanced hydraulic supports and then wirelessly transmit all the signals to an analysis and processing module; and
    the analysis and processing module, comprising a signal receiving and transmission device and a computer for analysis, located outside the laneway, connected to the signal transfer transmission module, and used to receive the signals from the signal integration and transmission device for analysis, wherein if an analysis result shows an abnormal situation, an alarm will be immediately given to a worker; and if the analysis result shows a continuous abnormal situation, or a relatively large value indicating the abnormal situation is generated, a command will be immediately sent to make the advanced hydraulic supports stop moving.

2. The system for navigation detection and inclination measurement of advanced hydraulic supports according to claim 1, wherein the ultrasonic sensors comprises:
    an ultrasonic sensor at a front end of a top plate of the advanced hydraulic support and an ultrasonic sensor at a front end of a bottom plate of the advanced hydraulic support, wherein the ultrasonic sensor at the front end of the top plate is located on a front side of the top plate of a single advanced hydraulic support, and is used to determine whether there is an obstacle in front of the top plate by emitting an ultrasonic wave and receiving an ultrasonic wave, measure the distance between the obstacle and the ultrasonic sensor at the front end of the top plate, and wirelessly transmit an obtained signal to the signal integration and transmission device; and the ultrasonic sensor at the front end of the bottom plate is located on a front side of the bottom plate of the single advanced hydraulic support, and is used to determine whether there is an obstacle in front of the bottom plate by emitting an ultrasonic wave and receiving an ultrasonic wave, measure the distance between the obstacle and the ultrasonic sensor at the front end of the bottom plate, and wirelessly transmit an obtained signal to the signal integration and transmission device;
    an ultrasonic sensor laterally on the front portion of the top plate and an ultrasonic sensor laterally on the rear portion of the top plate, wherein the ultrasonic sensor laterally on the front portion of the top plate is fixed to the front portion of the top plate, corresponds to a front hydraulic cylinder for horizontal movement of the top plate, and is used to determine whether there is an obstacle in a lateral direction of the front portion of the top plate by emitting an ultrasonic wave and receiving an ultrasonic wave and measure the distance between the obstacle and the ultrasonic sensor laterally on the front portion of the top plate; and the ultrasonic sensor laterally on the rear portion of the top plate is fixed to the rear portion of the top plate, corresponds to a rear hydraulic cylinder for horizontal movement of the top plate, and is used to determine whether there is an obstacle in a lateral direction of the rear portion of the top plate by emitting an ultrasonic wave and receiving an ultrasonic wave and measure the distance between the obstacle and the ultrasonic sensor laterally on the rear portion of the top plate; and
    an ultrasonic sensor laterally in the middle of the bottom plate, wherein the ultrasonic sensor laterally in the middle of the bottom plate is fixed to the middle of the bottom plate, corresponds to a hydraulic cylinder for horizontal movement of the bottom plate, and is used to determine whether there is an obstacle in a lateral direction of the middle of the bottom plate by emitting an ultrasonic wave and receiving an ultrasonic wave and measure the distance between the obstacle and the ultrasonic sensor laterally in the middle of the bottom plate.

3. The system for navigation detection and inclination measurement of advanced hydraulic supports according to claim 1, wherein the inclination measurement devices are respectively arranged on a top plate and bottom plate of a single advanced hydraulic support; and each said inclination measurement device comprises:
    an middle reference displacement sensor, laterally located in the middle of the top plate or the bottom plate, and used to acquire a displacement signal in a lateral direction of the middle of the top plate or the bottom plate and transmit the displacement signal to a signal collection and transmission device;
    a front displacement sensor, laterally located on a front portion of the top plate or the bottom plate, and used to acquire a displacement signal in a lateral direction of the front portion of the top plate or the bottom plate and transmit the displacement signal to the signal collection and transmission device;
    a rear displacement sensor, laterally located on a rear portion of the top plate or the bottom plate, and used to acquire a displacement signal in a lateral direction of the rear portion of the top plate or the bottom plate and transmit the displacement signal to the signal collection and transmission device; and
    the signal collection and transmission device, located beside the middle reference displacement sensor, and used to process the displacement signals received from the middle reference displacement sensor, front displacement sensor, and rear displacement sensor into the inclination signals and wirelessly transmit these inclination signals to the signal integration and transmission device in a laneway.

4. The system for navigation detection and inclination measurement of advanced hydraulic supports according to claim 1, wherein the signal receiving and transmission device receives the signals from the signal integration and transmission device and then transmits these signals to the computer for analysis to obtain an analysis result.

5. A system for navigation detection and inclination measurement of advanced hydraulic supports, comprising a detection device module, a signal transfer transmission module, and an analysis and processing module; wherein
- the detection device module is arranged on a single advanced hydraulic support;
- the detection device module comprises ultrasonic sensors and inclination measurement devices, wherein the ultrasonic sensors are used to emit ultrasonic waves to an outside of the single advanced hydraulic support and receive ultrasonic signals reflected from obstacles; and the inclination measurement devices are used to detect displacement signals of the single advanced hydraulic support and obtain inclination signals of the single advanced hydraulic support according to the displacement signals;
- the signal transfer transmission module comprises a signal integration and transmission device, and is located in a laneway, connected to the detection device module, and used to integrate, according to a serial number of each said advanced hydraulic support, ultrasonic signals and inclination signals received from all advanced hydraulic supports and then wirelessly transmit all the signals to the analysis and processing module; and
- the analysis and processing module comprises a signal receiving and transmission device and a computer for analysis, and is located outside the laneway, connected to the signal transfer transmission module, and used to receive the signals from the signal integration and transmission device for analysis, wherein if an analysis result shows an abnormal situation, an alarm will be immediately given to a worker; if the analysis result shows a continuous abnormal situation, or a relatively large value indicating the abnormal situation is generated, a command will be immediately sent to make the advanced hydraulic supports stop moving; the abnormal situation shown in the analysis result particularly refers to that values of the distances between the obstacles and the advanced hydraulic supports are not greater than a distance threshold, or values of the inclination signals are not less than a first inclination threshold; the continuous abnormal situation shown in the analysis result particularly refers to that values of duration of the inclination signals are not less than a time threshold of the abnormal situation; and the relatively large value indicating the abnormal situation refers to that the values of the inclination signals are not less than a second inclination threshold.

6. The system for navigation detection and inclination measurement of advanced hydraulic supports according to claim 5, wherein the ultrasonic sensors comprise an ultrasonic sensor at a front end of a top plate, an ultrasonic sensor laterally on a front portion of the top plate, an ultrasonic sensor laterally on a rear portion of the top plate, an ultrasonic sensor at a front end of a bottom plate, and an ultrasonic sensor laterally in the middle of the bottom plate; wherein
- the ultrasonic sensor at the front end of the top plate is located on a front side of the top plate of the single advanced hydraulic support, and is used to emit an ultrasonic wave to a forward direction of the top plate of the single advanced hydraulic support, receive an ultrasonic signal reflected from an obstacle, and wirelessly transmit the ultrasonic signal obtained from the forward direction of the top plate to the signal integration and transmission device; and the ultrasonic sensor at the front end of the bottom plate is located on a front side of the bottom plate of the single advanced hydraulic support, and is used to emit an ultrasonic wave to a forward direction of the bottom plate of the single advanced hydraulic support, receive an ultrasonic signal reflected from an obstacle, and wirelessly transmit the ultrasonic signal obtained from the forward direction of the bottom plate to the signal integration and transmission device;
- the ultrasonic sensor laterally on the front portion of the top plate is laterally fixed to the front portion of the top plate, corresponds to a front hydraulic cylinder for horizontal movement of the top plate, and is used to emit an ultrasonic wave to a lateral direction of the front portion of the top plate of the signal advanced hydraulic support, receive an ultrasonic signal reflected from an obstacle, and wirelessly transmit the ultrasonic signal obtained from the lateral direction of the font portion of the top plate to the signal integration and transmission device; and the ultrasonic sensor laterally on the rear portion of the top plate is laterally fixed to the rear portion of the top plate, corresponds to a rear hydraulic cylinder for horizontal movement of the top plate, and is used to emit an ultrasonic wave to a lateral direction of the rear portion of the top plate of the single advanced hydraulic support, receive an ultrasonic signal reflected from an obstacle, and wirelessly transmit the ultrasonic signal obtained from the lateral direction of the rear portion of the top plate to the signal integration and transmission device; and
- the ultrasonic sensor laterally in the middle of the bottom plate is fixed to the middle of the bottom plate, corresponds to a hydraulic cylinder for horizontal movement of the bottom plate, and is used to emit an ultrasonic wave to a lateral direction of the middle of the bottom plate of the single advanced hydraulic support, receive an ultrasonic signal reflected from an obstacle, and wirelessly transmit the ultrasonic signal obtained from the lateral direction of the middle of the bottom plate to the signal integration and transmission device.

7. The system for navigation detection and inclination measurement of advanced hydraulic supports according to claim 5, wherein the inclination measurement devices are respectively arranged on a top plate and bottom plate of the single advanced hydraulic support; and each said inclination measurement device comprises a middle reference displacement sensor, a front displacement sensor, a rear displacement sensor, and a signal collection and transmission device; wherein
- the middle reference displacement sensor is laterally located in the middle of the top plate or the bottom plate, and is used to acquire a displacement signal in a lateral direction of the middle of the top plate or the bottom plate and transmit the displacement signal to the signal collection and transmission device;
- the front displacement sensor is laterally located on a front portion of the top plate or the bottom plate, and is used to acquire a displacement signal in a lateral direction of the front portion of the top plate or the bottom plate and transmit the displacement signal to the signal collection and transmission device;
- the rear displacement sensor is laterally located on a rear portion of the top plate or the bottom plate, and is used to acquire a displacement signal in a lateral direction of the rear portion of the top plate or the bottom plate and transmit the displacement signal to the signal collection and transmission device; and the signal collection and transmission device beside the corresponding middle reference displacement sensor is used to process the displacement signals received from the middle reference displacement sensor, front displacement sensor, and rear displacement sensor into the inclination signals and wirelessly transmit these inclination signals to the signal integration and transmission device in a laneway.

8. The system for navigation detection and inclination measurement of advanced hydraulic supports according to claim 5, wherein the signal receiving and transmission device receives the signals from the signal integration and transmission device and then transmits these signals to the computer for analysis to obtain an analysis result.

\* \* \* \* \*